United States Patent
Battentier

(10) Patent No.: US 11,703,817 B2
(45) Date of Patent: Jul. 18, 2023

(54) SOLDER FATIGUE MODELING

(71) Applicant: Schlumberger Technology Corporation, Sugar Land, TX (US)

(72) Inventor: Amandine Battentier, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 86 days.

(21) Appl. No.: 17/452,324

(22) Filed: Oct. 26, 2021

(65) Prior Publication Data

US 2022/0137576 A1    May 5, 2022

Related U.S. Application Data

(60) Provisional application No. 63/106,929, filed on Oct. 29, 2020.

(51) Int. Cl.
*G05B 17/02* (2006.01)
*E21B 41/00* (2006.01)
*E21B 12/02* (2006.01)
*G01M 99/00* (2011.01)

(52) U.S. Cl.
CPC .............. *G05B 17/02* (2013.01); *E21B 12/02* (2013.01); *E21B 41/00* (2013.01); *E21B 2200/08* (2020.05); *E21B 2200/20* (2020.05); *G01M 99/002* (2013.01)

(58) Field of Classification Search
CPC ..... G05B 17/02; E21B 2200/20; E21B 41/00; E21B 2200/08; E21B 12/02; G01M 99/002

See application file for complete search history.

(56) References Cited

U.S. PATENT DOCUMENTS

| | | | | |
|---|---|---|---|---|
| 6,678,627 B1 * | 1/2004 | Starr | ...................... | G01M 7/022 |
| | | | | 702/119 |
| 9,411,913 B2 * | 8/2016 | Zhan | ........................ | G06F 30/20 |
| 2014/0290931 A1 * | 10/2014 | Patel | .................... | B23K 35/262 |
| | | | | 420/560 |

(Continued)

OTHER PUBLICATIONS

Day ("Limits on Morrow Mean Stress Correction of Manson-Coffin Life Prediction Models." Proceedings of the ASME 2011 Turbo Expo: Turbine Technical Conference and Exposition. vol. 6: Structures and Dynamics, Parts A and B. Vancouver, British Columbia, Canada. Jun. 6-10, 2011. pp. 85-92. ASME.) (Year: 2011).*

(Continued)

*Primary Examiner* — Daniel R Miller
*Assistant Examiner* — Christian T Bryant
(74) *Attorney, Agent, or Firm* — Jeffrey D Frantz

(57) ABSTRACT

The present disclosure models the testing of oilfield electronic equipment that operate in high temperature downhole environments (possibly with large vibrational loading) in order to quantify the damage to the electronic equipment over its expected operational lifetime. The simulated downhole environment is complex and includes coupled random vibration and thermal cycling followed by repeated shock at high temperature. In embodiments, the proposed methods and system measure non-linear damage accumulation of the electronic equipment in this simulated downhole environment.

12 Claims, 17 Drawing Sheets

(56) References Cited

U.S. PATENT DOCUMENTS

2015/0184467 A1* 7/2015 Patel ............... B23K 1/0008
166/65.1
2015/0275652 A1* 10/2015 Fanini ............... E21B 47/01
166/162

OTHER PUBLICATIONS

Ghaderi et al. (Combination of thermal cycling and vibration loading effects on the fatigue life of solder joints in a power module. Proceedings of the Institution of Mechanical Engineers, Part L: Journal of Materials: Design and Applications. 2019;233(9). doi: 10.1177/1464420718780525) (Year: 2019).*

Suryadi et al. ("Evolution of Drillstring Integrity Planning and Monitoring." Paper presented at the SPE Annual Caspian Technical Conference, Baku, Azerbaijan, Oct. 2019. doi: https://doi.org/10.2118/198397-MS) (Year: 2019).*

Qi (Plastic Ball Grid Array Solder Joint Reliability Assessment Under Combined Thermal Cycling and Vibration Loading Conditions, Dissertation, UMD College Park, 2006) (Year: 2006).*

Miner, Milton A., 1945, "Cumulative Damage in Fatigue", ASME, J. Appl. Mech., 12, 3, pp. A159-A164.

Darveaux, R. "Effect of simulation methodology on solder joint crack growth correlation," 2000 Proceedings. 50th Electronic Components and Technology Conference, 2000, pp. 1048-1058.

Darveaux, R., "Solder Joint Fatigue Life Model", Proceedings of TMS Annual Meeting, Odando, FL, Feb. 1997, pp. 213-218.

A. Perkins and S.K. Sitaraman, "A study into the sequencing of thermal cycling and vibration tests," 2008 58th Electronic Components and Technology Conference, 2008, pp. 584-592.

Osterman et al. "A Rapid Life-Prediction Approach for PBGA Solder Joints Under Combined Thermal Cycling and Vibration Loading Conditions", IEEE Transactions on Components and Packaging Technologies, vol. 32, No. 2, Jun. 2009, pp. 283-292.

* cited by examiner

Dry Electronic PWAs, MCMs and Sensors

| Test Type | Test Spec | Sample Size | Estimated Time | Test Machine |
|---|---|---|---|---|
| Manufacturing Screening* / HASS | 100311541 | 2 | 1 day | Mfg Screener / HALT Machine |
| HTO | 100311513 | | 5 days | Tool Oven |
| Accelerated Temp-Vib (ATV) ** | 100311509 | | 1 day | HALT Machine |
| Hot Shocks | 100311518 | | 2 to 14 days | Multi-purpose shock machine, or high-rate shock machine |

*: to be done in same manner as in final production
**: can be replaced by Thermal Cycle Test (100311514) if HALT machine not available

- Mfg. Screening
- High Temp Operations
- Accelerated Temp/Vib
- Hot shocks (4-axis 500G)

Fig. 2

SOLDER FATIGUE MODELING

CROSS-REFERENCE TO RELATED APPLICATION(S)

The present disclosure claims priority from U.S. Provisional Patent Appl. No. 63/106,929, filed on Oct. 29, 2020, herein incorporated by reference in its entirety.

FIELD

The present disclosure relates to testing and modeling of failure of oilfield electronic equipment.

BACKGROUND

Modern electronic equipment for oilfield applications is expected to provide increasing functionalities whilst still being able to withstand harsh downhole environmental conditions. Traditionally, electronic equipment for oilfield applications is developed using a design-build-test-fix process and empirical design rules. Such electronic equipment typically goes through multiple iterations of prototyping and physical verification and validation (V&V) tests in order to ensure that the equipment satisfies reliability requirements. The multiple iterations of such tests can lead to extra development time and cost.

Solder joints are the primary cause of failure in electronic equipment used in oilfield applications. For this reason, it is very beneficial to develop methods that predict the operation lifetime of solder joints in electronic equipment used in oilfield applications. Such predictions can be used in the design phase of the electronic equipment before prototyping and shorten the physical verification and validation (V&V) testing and thus save development time and associated costs and also accelerate the time to market for the equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure models the testing of oilfield electronic equipment that operate in high temperature downhole environments (possibly with large vibrational loading) in order to quantify the damage to the electronic equipment over its expected operational lifetime. The simulated downhole environment is complex including coupled random vibration and thermal cycling followed by repeated shock at high temperature.

In embodiments, the proposed methods and systems measure non-linear damage accumulation of the electronic equipment in this simulated downhole environment.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIG. 2 is a table that describes test methods and specifications for dry electronic printed wire assemblies, multichip modules and sensors of oilfield equipment used for downhole drilling and measuring applications;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The present disclosure models the testing of oilfield electronic equipment that operate in high temperature downhole environments (possibly with large vibrational loading) in order to quantify the damage to the electronic equipment over its expected operational lifetime. The simulated downhole environment is complex including coupled random vibration and thermal cycling followed by repeated shock at high temperature. In embodiments, the proposed methods and system measure non-linear damage accumulation of the electronic equipment in this simulated downhole environment.

Physical testing of oilfield electronic equipment is typically used to demonstrate the capability of such oilfield electronic equipment to survive the downhole environment during its intended operational lifetime. For example, it is commonplace to subject components of oilfield electronic equipment to predefined engineering qualification (EQ) test procedures. For example, the components can be board level electronics (such as dry electronic printed wire assemblies, multi-chip modules and sensors) that are packaged as part of the electronic equipment.

Figure 1:
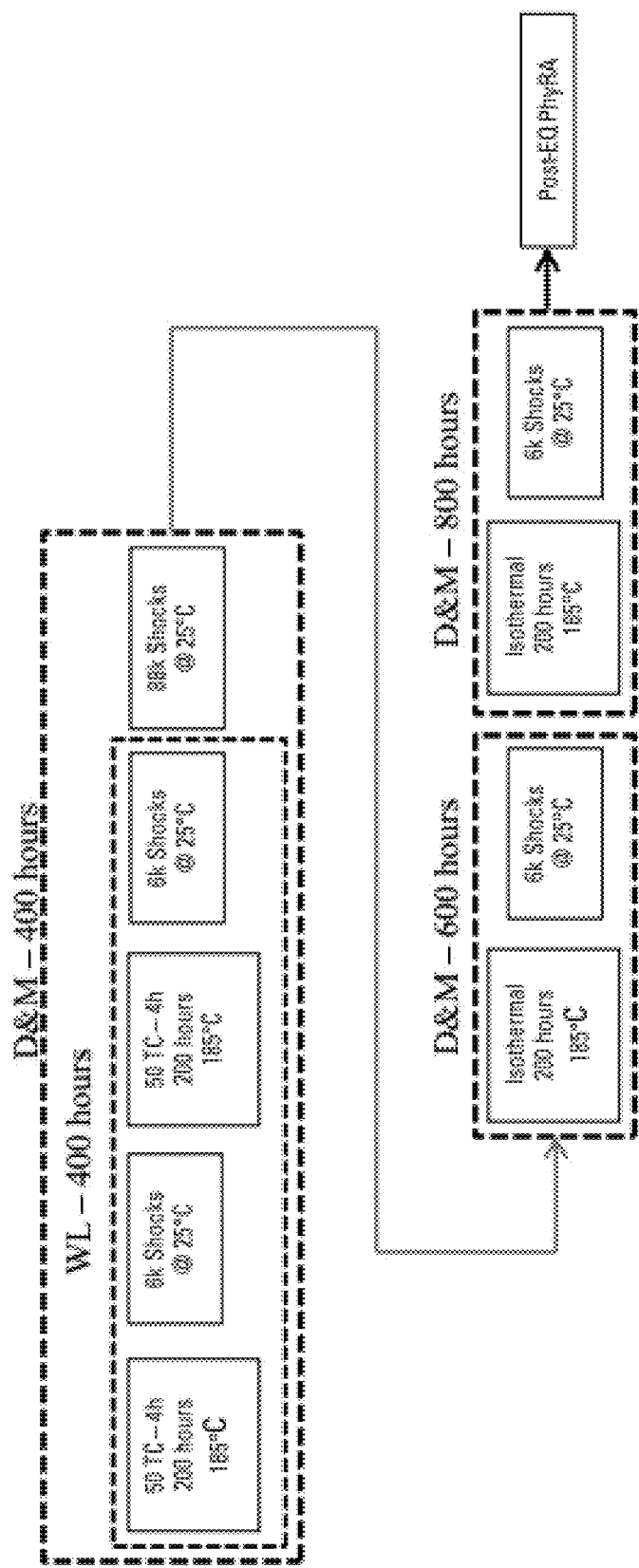
FIG. 1 is a schematic diagram of engineering qualification (EQ) tests for different profiles of oilfield electronic equipment.

FIG. 1 depicts example EQ test procedures for components of downhole wireline tools and downhole drilling and measurement tools that are intended to operate in downhole environments of up to 175° C. for up to 400 hours, 600 hours and 800 hours as shown.

FIG. 2 describes an example V&V test for board level electronics (including dry electronic printed wire assemblies, multi-chip modules and sensors) of downhole drilling and measurement tools that are intended to operate in downhole environments of up to 175° C. for up to 400 hours.

Figure 3:
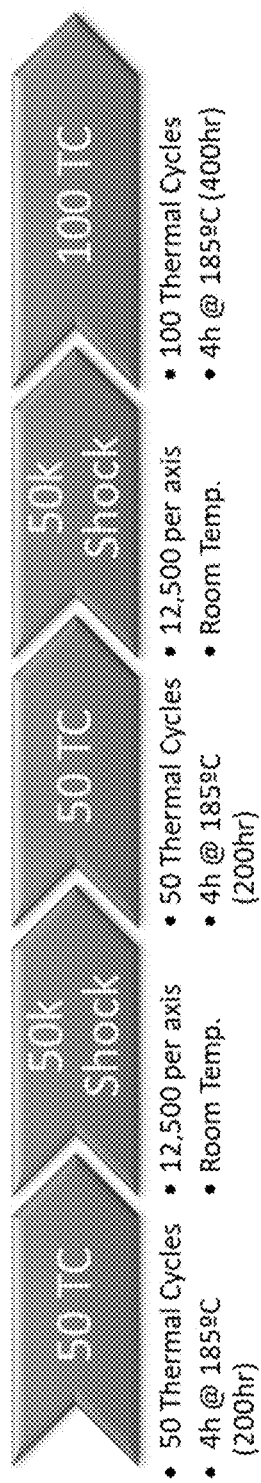
FIG. 3 is a schematic diagram of an engineering qualification (EQ) test for components of oilfield equipment used for downhole drilling and measuring applications, which are intended to operate in downhole environmental conditions up to 1750 for up to 400 hours.

FIG. 3 depicts an example EQ test procedure for board level electronics of downhole drilling and measurement tools that are intended to operate in downhole environments of up to 175° C. for up to 400 hours.

Figure 4:
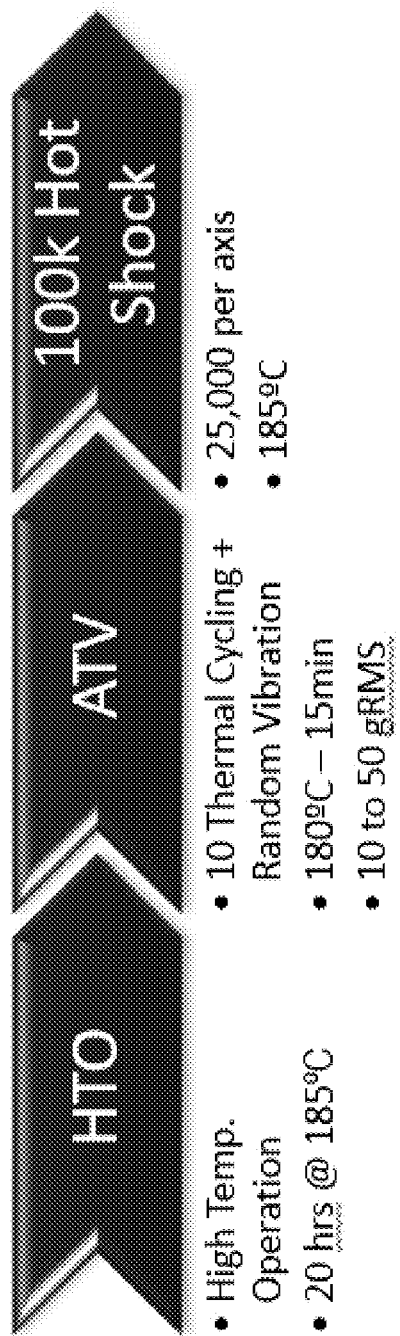
FIG. 4 is a schematic diagram of a verification and validation (V&V) test for components of oilfield equipment used for downhole drilling and measuring applications, which are intended to operate in downhole environmental conditions up to 175° for up to 400 hours.

FIG. 4 depicts an example V&V test procedure for board level electronics of downhole drilling and measurement tools that are intended to operate in downhole environments of up to 175° C. for up to 400 hours.

The test procedures of FIGS. 1 to 4 employ three key loading scenarios, either combined or sequential, as follows: thermal cycles (at high temperatures corresponding to the operational downhole environment, with a long dwell time for EQ test and short dwell time for V&V test); mechanical shock (at the high temperatures corresponding to the operational downhole environment as well as at room temperature); and random vibration.

Damage Accumulation

The Palmgren-Miner's rule is based on cumulative damage work. It defines the total damage index as a sum of the fractional damage at each stress level that the structure experience. If the total damage index is equal to or greater than one (D≥1), the structure will fail.

$$D = \sum_{i=1}^{P} \frac{n_i}{N_i} \quad \text{(Eq 1)}$$

Here, $n_i$ is the number of cycles exposure at $\sigma_i$ (i=1, 2, ..., p), $N_i$, fatigue life at stress $\sigma_i$, is the fatigue capability of that material at $\sigma_i$.

For solder joints subjected to V&V and EQ testing, the damage coming from each test will be added linearly to compute a total damage for the full qualification test. However, the residual stress coming from previous loading will be considered as a predefined field in the new model, hence the development of non-linear damage accumulation.

Mechanical Shock

For the EQ and V&V testing, mechanical shock and hot shock testing usually take place after thermal cycling. In this scenario, the residual stresses coming from thermal cycles can be included in the estimation of the number of shocks before failure.

Figure 5:
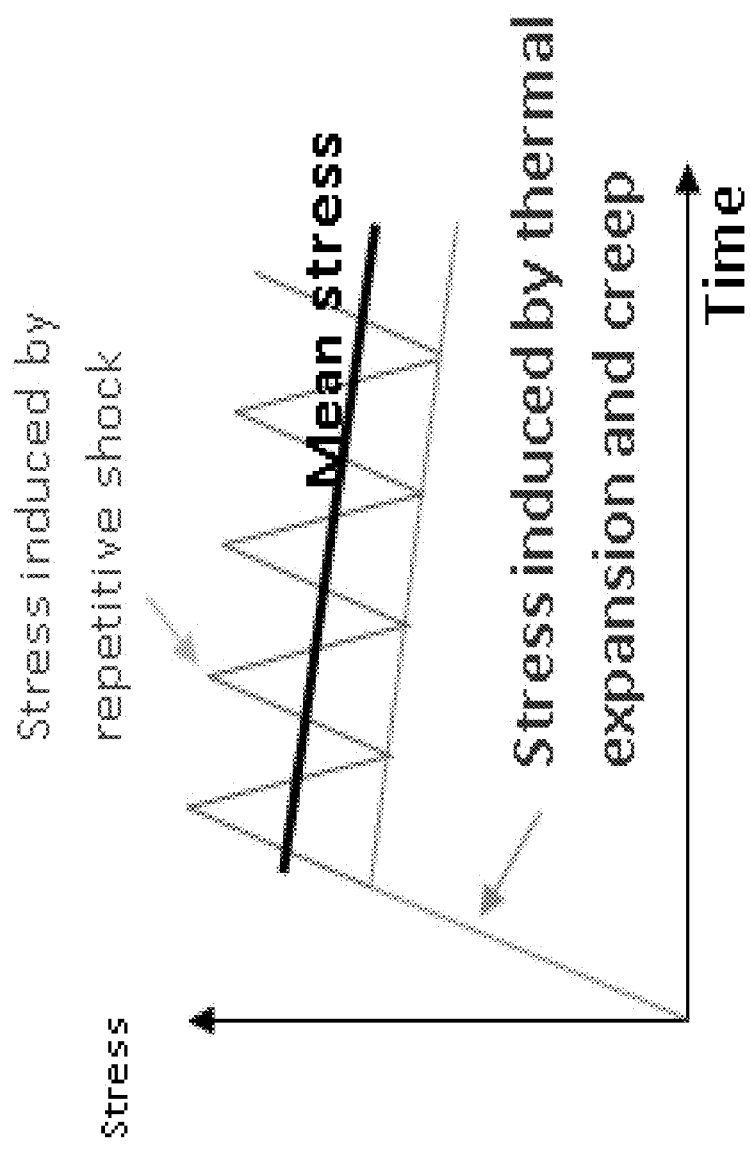
FIG. 5 is a plot of stress as a function of time in a solder joint to show the source of mean stress in the solder joint.

In addition, the number of shocks being repeated consecutively, a mean stress induced by a non-symmetric shock loading (stress ratio=0) can be accounted for, as described simplistically in FIG. 5.

Figure 6:
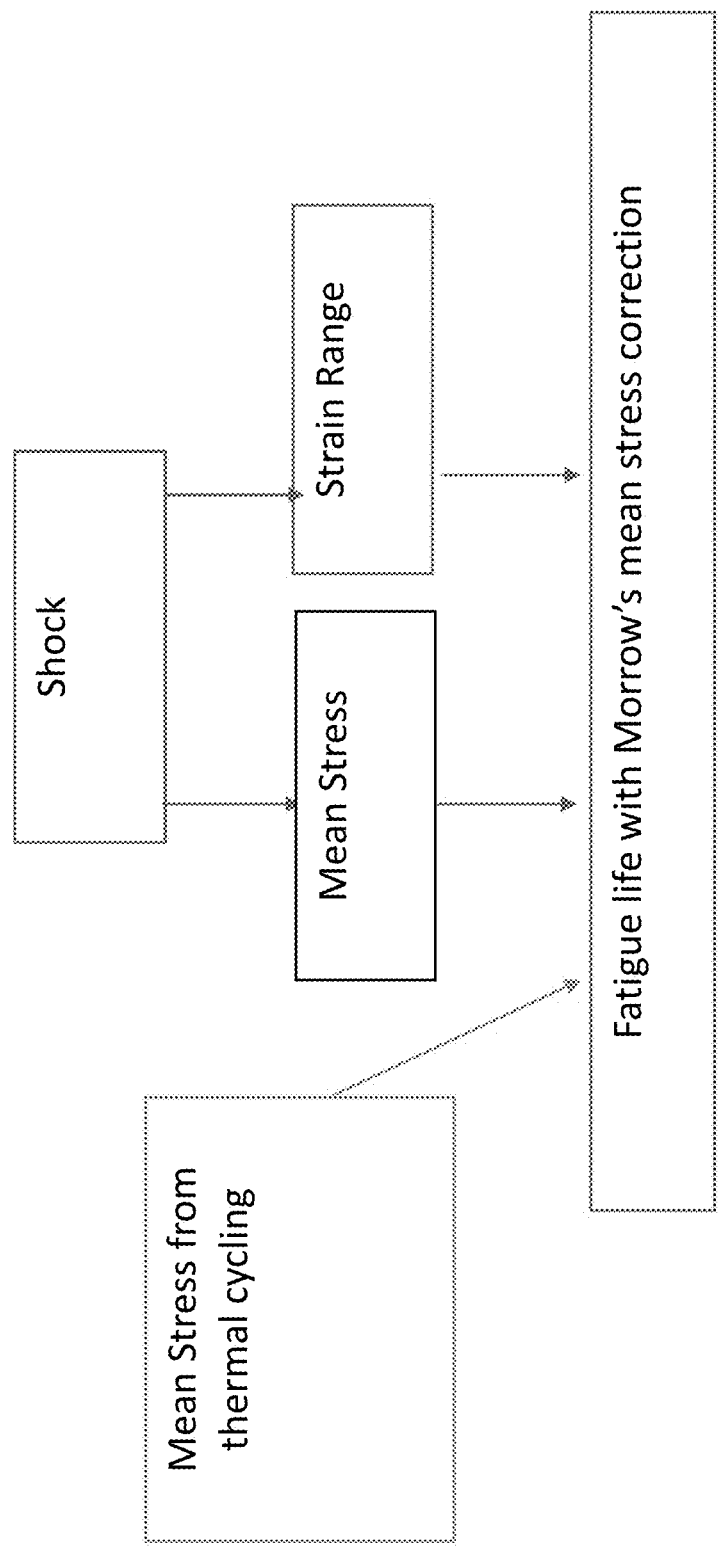
FIG. 6 is a schematic diagram of the methodology for predicting fatigue life of oilfield electronic equipment subject to shock loading or testing.

FIG. 6 is a schematic diagram illustrating a method of predicting damage (failure) of a downhole electrical equipment component subjected to thermal loading followed by shock loading, which involves the following:

Step 1: Determination of mean stress that results from thermal loading of the downhole electrical equipment component. The mean stress is extracted at the end of the thermo-mechanical analysis. This occurs after a few thermal cycles which are required to stabilize the stress and strain response. This residual tensor of stresses is used as a predefined field and act as mean stresses in the shock analysis.

Step 2: Determination of strain range in a solder joint (such as solder ball) coming from one shock to the downhole electrical equipment component. The strain range is determined by subtracting the minimal strain value over the shock response to the maximal strain value over the shock response of the solder ball.

Step 3: Determination of mean stress that results from the shock loading of the downhole electrical equipment component. The mean stress from the shock loading is determined by adding the minimal stress value to the maximal strain value over the shock response in the solder ball and by dividing this value by two.

Step 4: Determination of fatigue life with Morrow's mean stress correction for the downhole electrical equipment component based on the strain range of 2) and the mean stress of 3). The cycles to failure $2N_f$ are computed with the following fatigue life equation including the strain range $\Delta\varepsilon_e$ and the mean stress $\sigma_m$:

$$\frac{\Delta\varepsilon_e}{2} = \frac{\sigma'_f - \sigma_m}{E} * (2N_f)^b$$

where $\sigma'_f$ is the fatigue strength coefficient, b is the fatigue strength exponent, E is the elastic modulus and are inherent material properties.

Random Vibration and ATV

Figure 7:
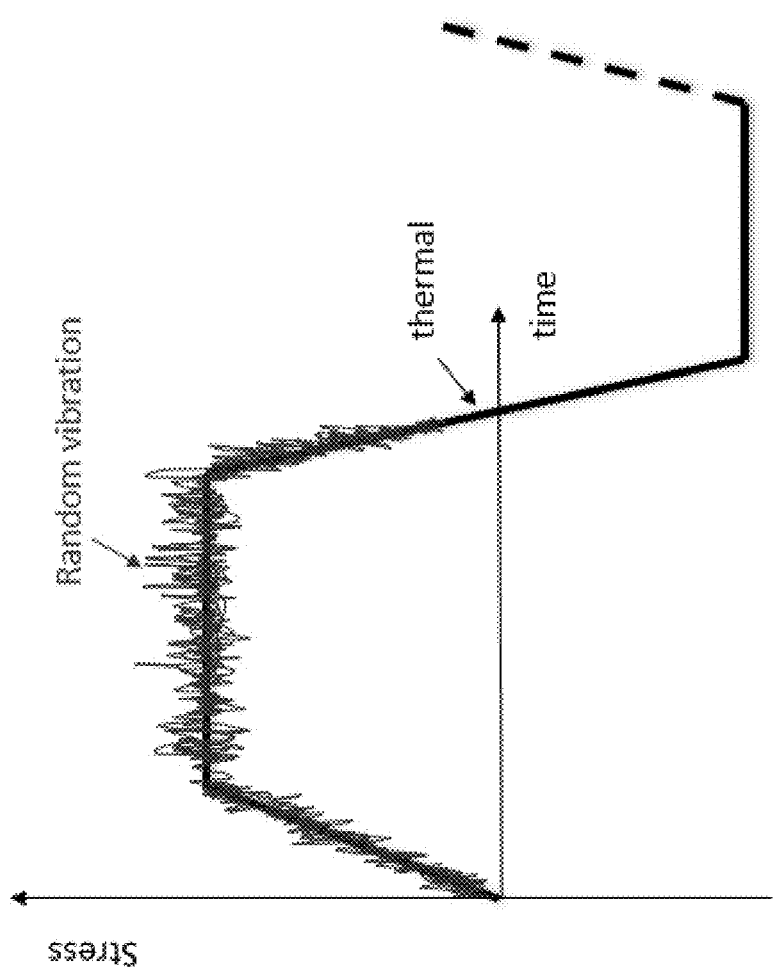
FIG. 7 is a plot of stress as a function of time to show the stress induced by a combination of thermal cycling and random vibration.

The testing of the components of the downhole electrical equipment can involve accelerated temperature & vibration (ATV) testing where stresses induced by thermal loading are high in magnitude but are repeated for a limited number of times (such as 10 times). The stresses induced by the vibration loading are however much smaller in amplitude but are repeated thousands or millions of times, depending on the vibration response of the component. Coupling high-cycle fatigue to low-cycle fatigue induced stress is challenging from a dynamic numerical standpoint. The approach taken here is thus to consider the stress induced by the thermal cycling as a mean stress for the vibration loading (See FIG. 7). Since the temperature is varying, multiple phases of temperature shall be considered to represent the real ATV test. In addition, the vibration level during ATV test typically varies from 10 gRMS to 50 gRMS. The damage computation can be considered for a vibration magnitude step and each mean stress scenario.

Damage Computation for a Full ATV Test

The methodology described above is for one ATV gRMS level. During ATV cycles, the component under test can be subject to different steps of random vibration, typically from 10 gRMS to 50 gRMS. These steps can also occur at different ambient temperatures depending on the time the random vibration is carried out.

Figure 8:
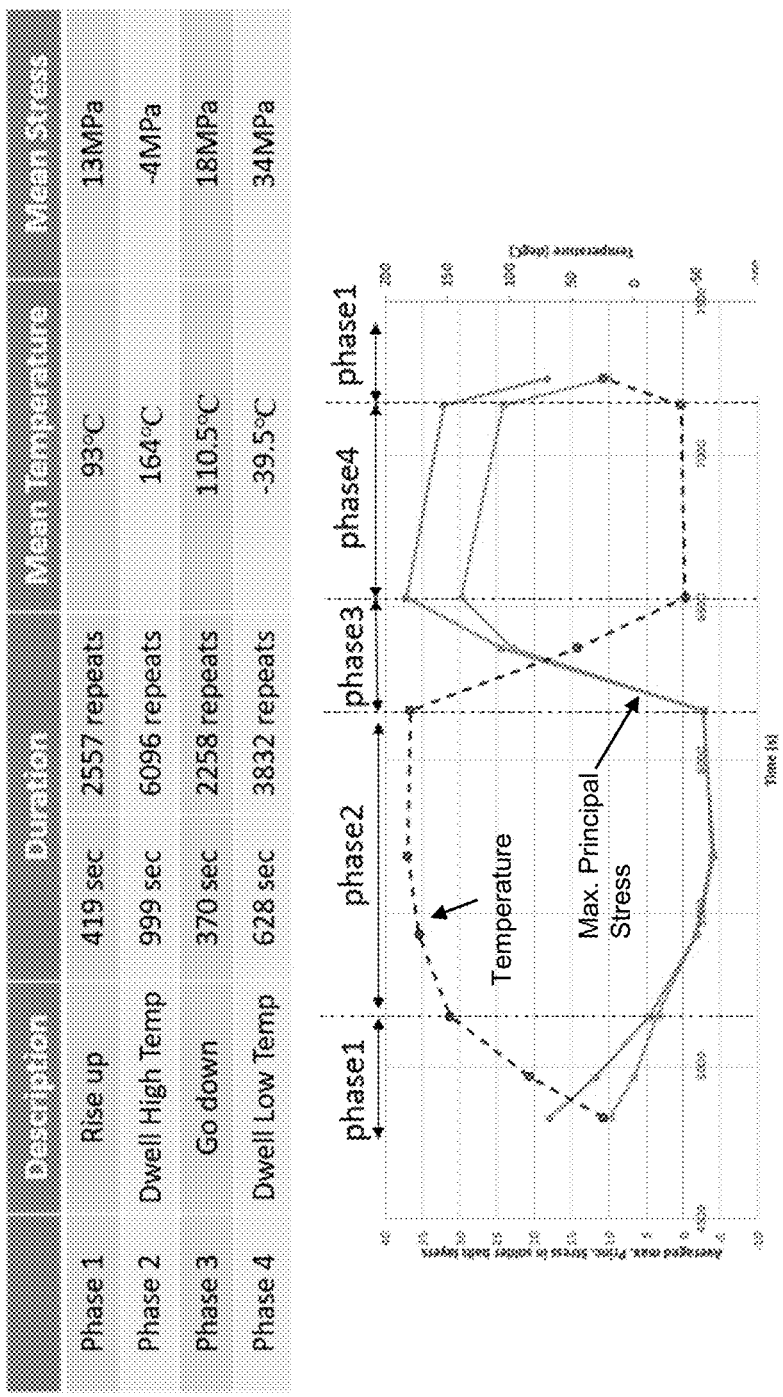
FIG. 8 is a plot of temperature and mean stress over time for a sequence of four thermal loading phases.

In embodiments, one ATV thermal cycling can be logically partitioned into four different phases: (a) ramp up in temperature, (b) stay at high temperature, (c) ramp down in temperature, (d) stay at low temperature, and extract the mean stress for each thermal loading, as described in FIG. 8.

Figure 9:
FIG. 9 is a table of vibration steps duration as a function of a number of thermal loading phases.

Note that the time spent for each temperature phase can be estimated for each vibration step as shown in FIG. 9. After using the appropriate phase and temperature for the different vibration levels, the damage estimated for each vibration step can be computed and added linearly following the Miner's rule.

Combine the Loadings for the V&V or EQ Test Sequence

The predicted damage for each individual loading shall be calculated and cumulated to obtain a predicted total damage for the entire test sequence. Multiple experimental benchmark studies were carried out to demonstrate the validity of the method.

Example V&V Test Sequence

An example V&V test sequence including high temperature operation (HTO) followed by accelerated temperature and vibration (ATV) followed by a hot shock test as shown in FIG. 4. The HTO includes operation of the component for 20 hours at 185° C. In this HTO, the SAC305 Anand constant is modified with aging for the following ATV thermal cycling. The ATV involves 10 thermal cycles (185° C. for 15 minutes) with random vibration loading in the range of 10 to 50 gRMS. The hot shock test involves 100K shock tests at 185° C.

Figure 10:
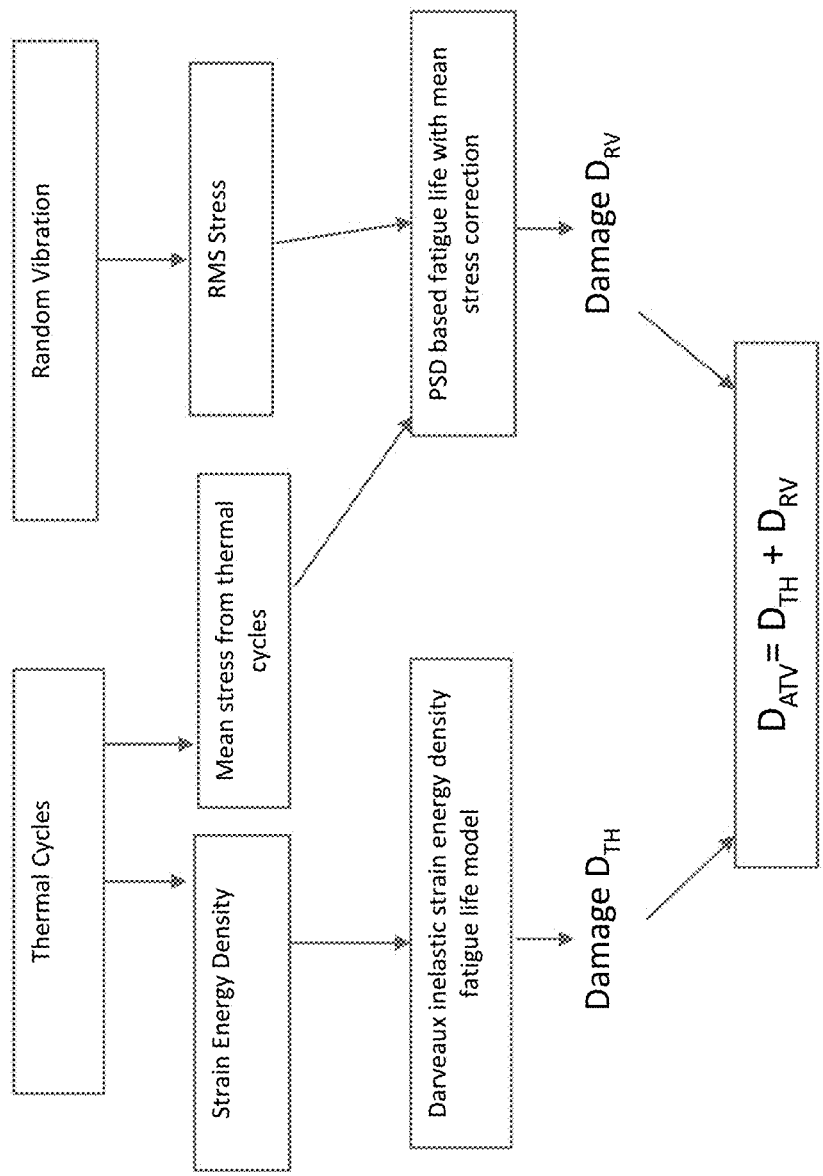
FIG. 10 is a schematic diagram of a methodology for predicting fatigue life and damage of oilfield electronic equipment subject to an accelerated temperature and vibration (ATV) test.
Figure 17:
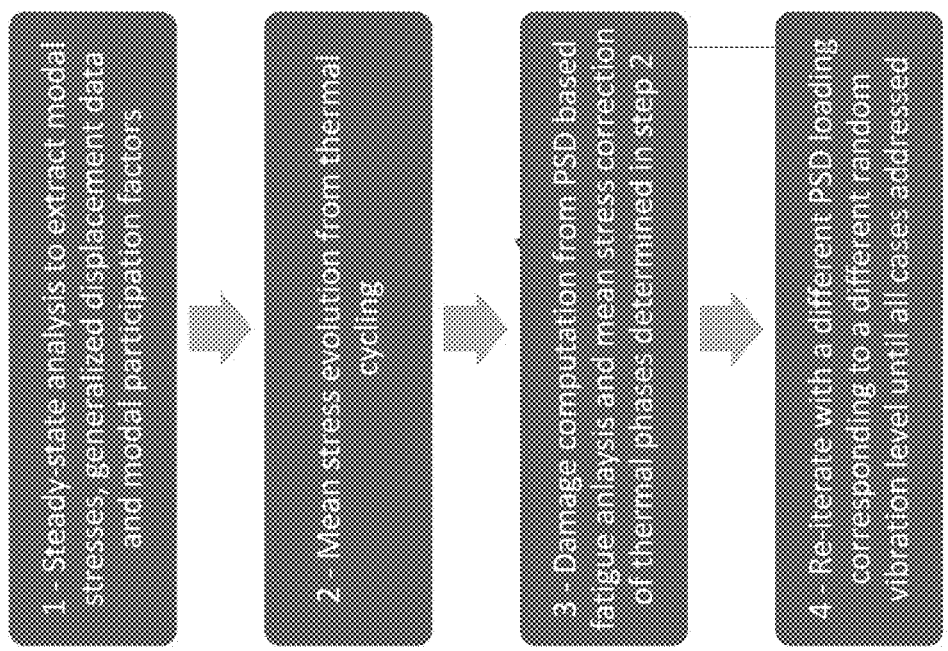
FIG. 17 is a random vibration fatigue workflow.

FIG. 10 is a schematic diagram illustrating a method of predicting damage to a downhole electrical equipment component under test due to the ATV thermal cycling of the example V&V test sequence described above. The root mean square (rms) stress is computed by integrating the single-sided power spectral density $S_x$ of the variable over the frequency range $\sigma_{rms} = \sqrt{\int_{f1}^{f2} S_x(f) df}$. The fatigue analysis from a random response (FIG. 17) uses the modal analysis and the steady-state solutions for unit loads to extract modal participation factors for each loading direction and obtain a frequency response function (FRF) matrix representative of the assembly. With the general input PSD matrix, modal stresses, spectral moment and the probability, density functions can be calculated to estimate the damage at the location of interest. The input PSD are projected on critical planes to account for multi-axial loading and a stress-based algorithm with critical plane research method is used to compute the damage. The displacements and stress/strain resulting from the thermal expansion of the assembly after stabilization of the stress/strain hysteresis loop are considered as an initial state of the vibration analysis. A Basquin power law relation is used to compute the high number of cycles before failure. A mean stress correction is applied to the fatigue model. It can be done either by importing the stress responses from the thermo-mechanical analysis at each node of the model or by using the goodman fixed mean stress correction (scalar value of the averaged stress). Basquin model with temperature dependence of fatigue constants based on the Arrhenius equation introduced in the Power law is used. A life-repeat with a base 10 logarithmic scale is first provided as output of the fatigue model. This life-repeat is a finite volume-weighted averaged along the layer of interest in the solder ball. The inverse quantity of the LOG life-repeats (10^(LOG life-repeats)) provides the lifetime in [repeats] unit. Multiplying this quantity by the PSD length (in seconds), used to compute the fatigue life, provides the time-to-failure in seconds. Then, the random vibration damage index Dry is derived by dividing the number of cycles exposure by the computed fatigue life.

The damage resulting from the thermal cycling is estimated by calculating the average strain energy density range $\Delta W_{ave}$ during the last thermal cycling after stabilization of the hysteresis loop by using a finite volume-weighted averaging technique to describe the response in the area of interest:

$$\Delta W_{ave} = \frac{\sum \Delta W \cdot V}{\sum V},$$

V=finite element volume, $\Delta W$=inelastic strain energy density range of the element.

The areas of interest are the interfacial zones of the solder joint with other parts and follow the presumed cracked area in the solder joint.

In the second step, the number of cycles to initiate the crack is calculated as per the Darveaux inelastic strain energy density low cycle fatigue approach.

The Darveaux fatigue approach includes separate power law type relations for estimating crack initiation $N_0$ and crack growth rate $$\frac{da}{dN}$$

in solder joints by using the average strain energy density range $\Delta W_{ave}$ and model constants $K_1$, $K_2$, $K_3$, and $K_4$ which can vary with ageing time and temperatures.

$$N_0 = K_1 \Delta W_{avg}^{K_2}$$

$$\frac{da}{dN} = K_3 \Delta W_{avg}^{K_4}$$

The number of cycles until failure $N_f$ should be estimated by using the crack initiation $N_0$, the crack growth rate da/dN and the length of the crack. Extensive experimental work demonstrated that a full crack of the joint surface is needed to make the joint fail functionally. The diameter d of the solder ball at the interface with the package is used to claim a failure.

$$N_f = N_0 + \frac{d}{da/dN}$$

The damage Dth induced by the thermal cycling is derived by dividing the number of thermal cycles exposed by the computed fatigue life $N_f$.

The total ATV damage is then calculated by adding the damage induced by random vibration Drv and the damage induced by thermal cycling Dth.

Figure 11:
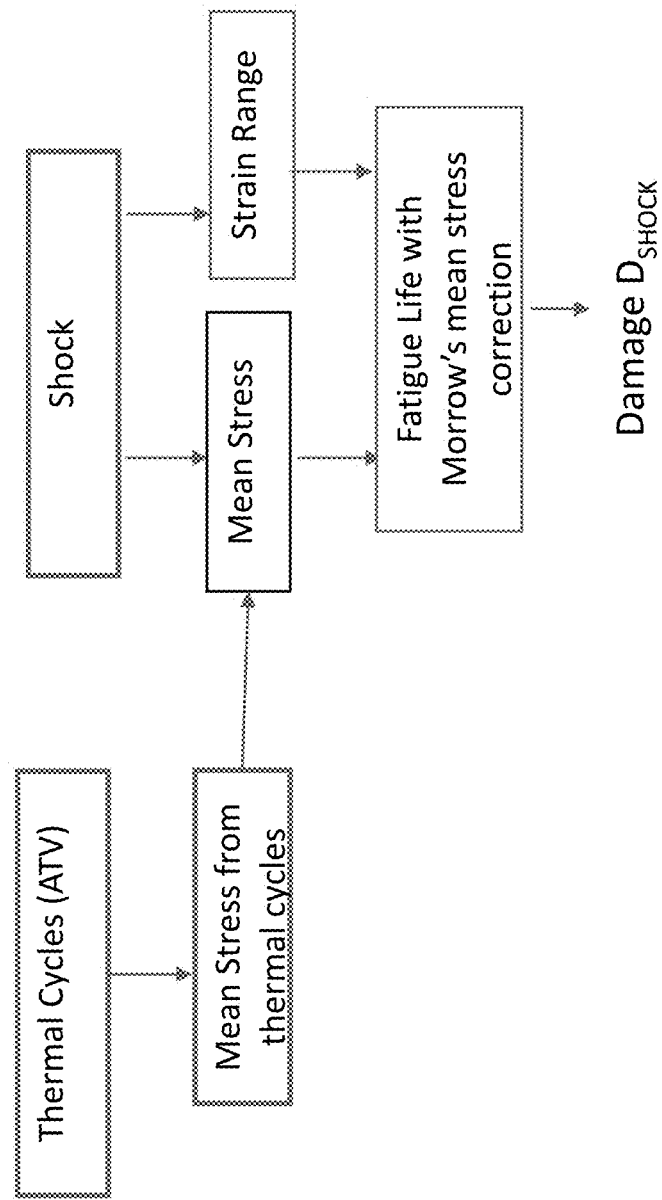
FIG. 11 is a schematic diagram of a methodology for predicting fatigue life and damage of oilfield electronic equipment subject to a hot shock test.

FIG. 11 is a schematic diagram illustrating a method of predicting damage to a downhole electrical equipment component under test as a result of the hot shock test of the example V&V test sequence described above. The calculation of the fatigue with mean stress correction is similar to the operations described above with respect to FIG. 6, with the exception that additional stresses induced by the thermal expansion of the solder joint due to the rise in temperature is considered as a predefined field prior to the shock loading.

Figure 12:
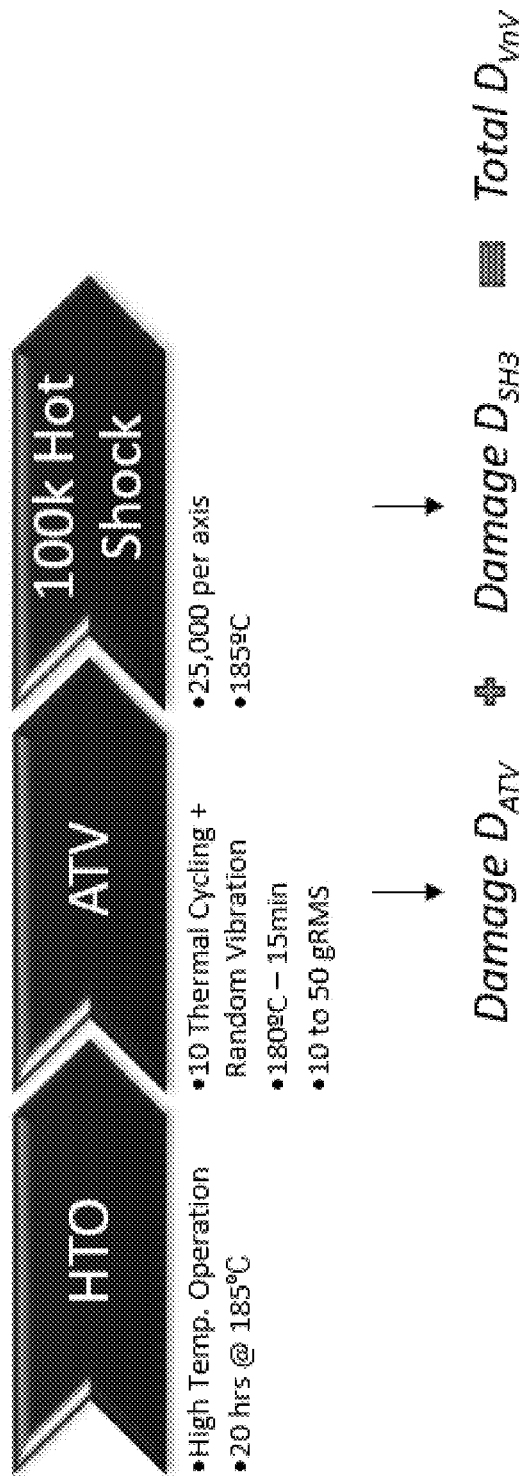
FIG. 12 is a schematic diagram that illustrates an example verification and validation (V&V) test and the predicted total damage determined by the combined methodologies of FIGS. 10 and 11.

FIG. 12 is a schematic diagram illustrating a method of predicting damage to a downhole electrical equipment component under test due to the example V&V test sequence described above, which combines the damage assessment result data $D_{ATV}$ of the ATV thermal cycling of FIG. 10 with the damage assessment result data $D_{SH3}$ of the hot shock test of FIG. 11 to provide an accumulated total damage $D_{VnV}$. Note that, if the accumulated total damage $D_{VnV}$>0.5 (+/−50% of accuracy in the prediction), there is a high risk of failure.

Figure 13:
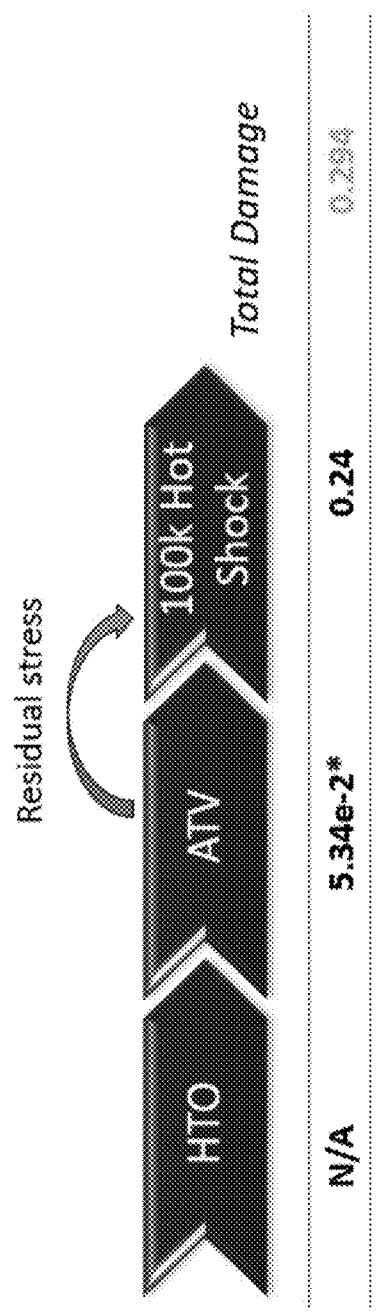
FIG. 13 is a schematic diagram that illustrates an example of the predicted total damage determined by the combined methodologies of FIGS. 10 and 11 for a verification and validation (V&V) test of a particular component of oilfield electronics equipment.

FIG. 13 illustrates an example of the prediction of total damage $D_{VnV}$ for a particular downhole electrical equipment component (BGAHio001 PWA). The total damage is less than 0.3 and the two boards successfully pass the corresponding V&V test sequence.

Example EQ Test Profile

Figure 14:
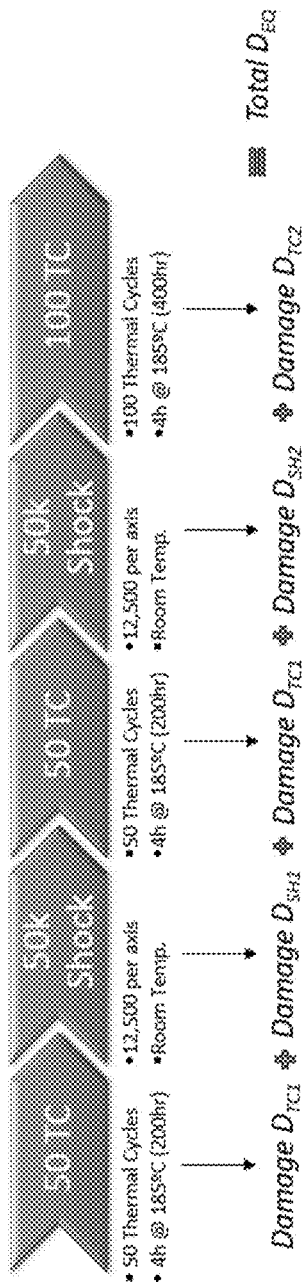
FIG. 14 is a schematic diagram that illustrates an example engineering qualification (EQ) test and the predicted total damage determined by the combined methodologies of FIGS. 10 and 11.

An example EQ test sequence includes consecutive thermal cycling followed by shock testing (at room temperature) as shown in FIG. 3. Similar to the example EV test sequence described above, the total damage for the example EQ test sequence can be predicted by accumulating the damage for each loading as shown in FIG. 14. If the accumulated total damage $D_{EQ}$>0.5 (+/−50% of accuracy in the prediction), there is a high risk of failure.

Note that the use of a parameter that quantifies predicted total damage over the entire test sequence allows for normalization of the lifetime quantity used for each loading (time to failure, cycles to failure, number of shocks, etc.). A reverse process can easily be completed by estimating the remaining time to failure based on the individual loading failure quantity.

Figure 15:
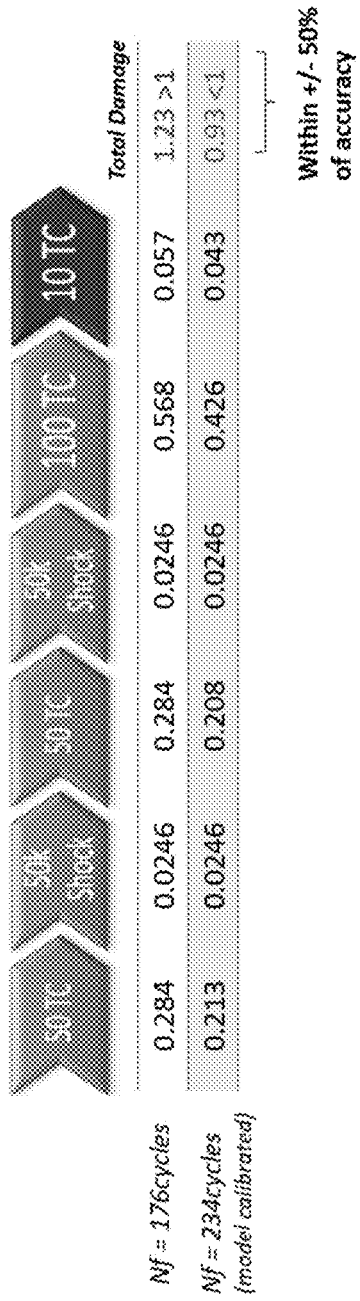
FIG. 15 is a schematic diagram that illustrates an example of the predicted total damage determined by the combined methodologies of FIGS. 10 and 11 for an engineering qualification (EQ) test of a particular component of oilfield electronics equipment.

FIG. 15 illustrates an example of the prediction of total damage $D_{EQ}$ for a particular downhole electrical equipment component (BGAHio001 PWA). The total damage was estimated at 1.23, predicting a high risk of failure. The board failed after 110 thermal cycles, which is +23% of difference with the experimental findings. The predictions are conservative. By calibrating the model to match properly the first thermal cycling time-to-failure, the results are still in the +/−50% confidence bounds.

Figure 16:
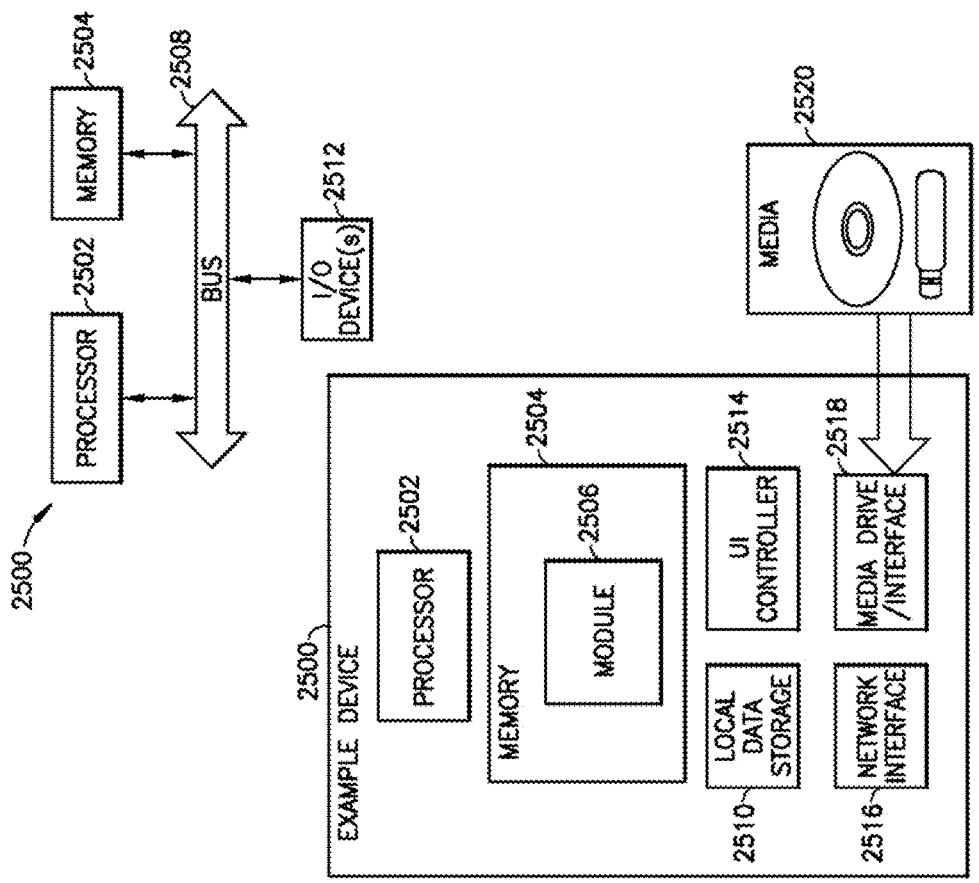
FIG. 16 is a schematic diagram of a computing device.

FIG. 16 illustrates an example computing device 2500, with a processor 2502 and memory 2504 that can be configured to implement parts or all of various embodiments of the methods and systems described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the methods and systems of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the methods or processes as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

There have been described and illustrated herein several embodiments of methods for testing and modeling fatigue in components of oilfield electronic equipment. While particular scenarios have been disclosed in reference to test methodologies, it will be appreciated that other scenarios could be used as well. It will therefore be appreciated by those skilled in the art that yet other modifications could be made to the provided invention without deviating from its spirit and scope as claimed. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of predicting damage of a downhole electrical equipment component comprising:
   exposing the downhole electrical equipment component to a first thermal loading;
   collecting first data from the downhole electrical equipment component while exposed to the first thermal loading;
   determining a first mean stress from the first thermal loading of the downhole electrical equipment component based on the collected first data;
   exposing the downhole electrical equipment component to a random vibrational loading;
   collecting second data from the downhole electrical equipment component while exposed to the random vibrational loading;
   determining a second mean stress from the random vibrational loading of the downhole electrical equipment component based on the collected second data;
   estimating a first fatigue life of the downhole electrical equipment component based on the first mean stress and the second mean stress;
   determining a first damage parameter based on the first fatigue life, wherein the first damage parameter is representative of first damage to the downhole electrical equipment component during the first thermal loading and the random vibrational loading;
   exposing the downhole electrical equipment component to a second thermal loading;
   collecting third data from the downhole electrical equipment component while exposed to the second thermal loading;
   determining a third mean stress from the second thermal loading of the downhole electrical equipment component based on the third data;
   exposing the downhole electrical equipment component to a shock loading;
   collecting fourth data from the downhole electrical equipment component while exposed to the shock loading;
   determining a fourth mean stress from the shock loading of the downhole electrical equipment component based on the fourth data;
   estimating a second fatigue life of the downhole electrical equipment component based on the third mean stress and the fourth mean stress;
   determining a second damage parameter based on the second fatigue life, wherein the second damage parameter is representative of second damage to the downhole electrical equipment component during the second thermal loading and the shock loading; and
   combining the first damage parameter and the second damage parameter to generate a total damage parameter.

2. The method of claim 1, wherein:
   the first fatigue life of the downhole electrical equipment component and the second fatigue life of the downhole electrical equipment component are both determined using Morrow's mean stress correction.

3. The method of claim 1, wherein:
the first thermal loading and the random vibrational loading are combined over a plurality of phases having varying vibrational loadings at specific respective temperatures or specific respective ranges of temperatures.

4. The method of claim 3, wherein:
the plurality of phases include at least one phase during which the temperature increases over the respective range of temperatures, at least one phase at a relatively high temperature, and at least one phase during which the temperature decreases over the respective range of temperatures.

5. The method of claim 1, wherein:
the second thermal loading and the shock loading include at least one cycle of the shock loading at a specific temperature or a specific range of temperatures.

6. The method of claim 1, wherein:
the second thermal loading and the shock loading are performed in separate cycles including at least one cycle of the second thermal loading at a specific temperature or a specific range of temperatures without the shock loading, and at least one cycle of the shock loading at an ambient temperature.

7. A system, comprising:
one or more processors; and
a memory, accessible by the one or more processors, the memory storing instructions that, when executed by the one or more processors, cause the one or more processors to perform operations comprising:
exposing a downhole electrical equipment component to a first thermal loading;
collecting first data while the downhole electrical equipment component is exposed to the first thermal loading;
determining a first mean stress from the first thermal loading of the downhole electrical equipment component based on the collected first data;
exposing the downhole electrical equipment component to a random vibrational loading;
collecting second data while the downhole electrical equipment component is exposed to the random vibrational loading;
determining a second mean stress from the random vibrational loading of the downhole electrical equipment component based on the collected second data;
estimating a first fatigue life of the downhole electrical equipment component based on the first mean stress and the second mean stress;
determining a first damage parameter based on the first fatigue life, wherein the first damage parameter is representative of first damage to the downhole electrical equipment component during the first thermal loading and the random vibrational loading;
exposing the downhole electrical equipment component to a second thermal loading;
collecting third data while the downhole electrical equipment component is exposed to the second thermal loading;
determining a third mean stress from the second thermal loading of the downhole electrical equipment component based on the third data;
exposing the downhole electrical equipment component to a shock loading;
collecting fourth data while the downhole electrical equipment component is exposed to the shock loading;
determining a fourth mean stress from the shock loading of the downhole electrical equipment component based on the fourth data;
estimating a second fatigue life of the downhole electrical equipment component based on the third mean stress and the fourth mean stress;
determining a second damage parameter based on the second fatigue life, wherein the second damage parameter is representative of second damage to the downhole electrical equipment component during the second thermal loading and the shock loading; and
combining the first damage parameter and the second damage parameter to generate a total damage parameter.

8. The system of claim 7, wherein the first fatigue life of the downhole electrical equipment component and the second fatigue life of the downhole electrical equipment component are determined using Morrow's mean stress correction.

9. The system of claim 7, wherein the downhole electrical equipment component is simultaneously exposed to the first thermal loading and the random vibrational loading over a plurality of phases having varying vibrational loadings at specific respective temperatures or specific respective ranges of temperatures.

10. The system of claim 9, wherein the plurality of phases include at least one phase during which the temperature increases over the respective range of temperatures, at least one phase at a steady state temperature, and at least one phase during which the temperature decreases over the respective range of temperatures.

11. The system of claim 7, wherein the second thermal loading and the shock loading include at least one cycle of the shock loading at a specific temperature or a specific range of temperatures.

12. The system of claim 7, wherein the second thermal loading and the shock loading are performed in separate cycles including at least one cycle of the second thermal loading at a specific temperature or a specific range of temperatures without the shock loading, and at least one cycle of the shock loading at an ambient temperature.

* * * * *